(12) United States Patent
Grabbe

(10) Patent No.: US 6,817,777 B1
(45) Date of Patent: Nov. 16, 2004

(54) FIBER ARRAY FERRULE

(75) Inventor: Dimitry Grabbe, 2160 Rosedale Ave., Middletown, PA (US) 17057-3453

(73) Assignee: Dimitry Grabbe, Middletown, PA (US)

( * ) Notice: Subject to any disclaimer, the term of this patent is extended or adjusted under 35 U.S.C. 154(b) by 0 days.

(21) Appl. No.: 10/608,490

(22) Filed: Jun. 27, 2003

(51) Int. Cl.[7] .............................. G02B 6/36; G02B 6/26; G02B 6/42; G02B 6/43

(52) U.S. Cl. ............................. 385/59; 385/53; 385/54; 385/55; 385/56; 385/58; 385/59; 385/60; 385/65

(58) Field of Search .......................... 385/52–56, 58–60, 385/65, 69–72, 76–78, 83, 85, 86, 89

(56) References Cited

U.S. PATENT DOCUMENTS

| | | | |
|---|---|---|---|
| 3,864,018 A | 2/1975 | Miller | 350/96 |
| 4,101,198 A | 7/1978 | Heldt | 350/96.2 |
| 4,702,547 A | 10/1987 | Enochs | 350/96.2 |
| 4,752,109 A | 6/1988 | Gordon et al. | 350/96.2 |
| 4,818,058 A | 4/1989 | Bonanni | 350/96.2 |
| 5,037,179 A | 8/1991 | Bortolin et al. | 385/54 |
| 5,044,711 A | 9/1991 | Saito | 350/96.2 |
| 5,243,673 A | 9/1993 | Johnson et al. | 385/90 |
| 5,268,981 A | 12/1993 | Shahid | 385/71 |
| 5,287,426 A | 2/1994 | Shahid | 385/85 |
| 5,377,289 A | 12/1994 | Johnson et al. | 385/65 |
| 5,379,361 A | 1/1995 | Maekawa et al. | 385/65 |
| 5,404,417 A | 4/1995 | Johnson et al. | 385/137 |
| 5,430,819 A | 7/1995 | Sizer, II et al. | 385/59 |
| 5,483,611 A | 1/1996 | Basavanhally | 385/78 |
| 5,519,798 A * | 5/1996 | Shahid et al. | 385/65 |
| 5,548,677 A | 8/1996 | Kakii et al. | 385/92 |
| 5,613,024 A | 3/1997 | Shahid | 385/52 |
| 5,742,720 A | 4/1998 | Kobayashi et al. | 385/89 |
| 5,843,611 A | 12/1998 | Sukata et al. | 430/110 |
| 5,845,026 A * | 12/1998 | Lee et al. | 385/58 |
| 6,045,270 A | 4/2000 | Weiss et al. | 385/59 |
| 6,259,856 B1 | 7/2001 | Shahid | 385/147 |
| 6,261,006 B1 * | 7/2001 | Selfridge | 385/56 |
| 6,357,928 B1 * | 3/2002 | Haley et al. | 385/59 |
| 6,364,539 B1 | 4/2002 | Shahid | 385/83 |
| 6,386,767 B1 | 5/2002 | Naghski | 385/59 |
| 6,435,730 B1 * | 8/2002 | Kevern et al. | 385/78 |
| 6,450,697 B1 | 9/2002 | Ngo | 385/78 |
| 6,457,878 B2 * | 10/2002 | Edwards et al. | 385/96 |
| 6,461,053 B1 * | 10/2002 | Mayercik et al. | 385/56 |
| 6,474,878 B1 | 11/2002 | Demangone | 385/78 |
| 6,565,264 B1 * | 5/2003 | Johnson et al. | 385/78 |
| 6,641,310 B2 * | 11/2003 | Williams | 385/92 |
| 6,695,488 B2 * | 2/2004 | Grabbe | 385/78 |
| 2002/0150349 A1 | 10/2002 | Shahid | 385/65 |
| 2003/0016918 A1 | 1/2003 | Grabbe | 385/78 |
| 2003/0095758 A1 * | 5/2003 | Morse et al. | 385/89 |
| 2004/0105628 A1 * | 6/2004 | Morse et al. | 385/89 |

FOREIGN PATENT DOCUMENTS

| | | |
|---|---|---|
| EP | 0410181 A2 | 1/1991 |
| EP | 10982131 A1 | 5/2001 |
| JP | 05134146 | 5/1993 |

* cited by examiner

*Primary Examiner*—John R. Lee
*Assistant Examiner*—Bernard E. Souw
(74) *Attorney, Agent, or Firm*—Barley Snyder

(57) ABSTRACT

The invention provides an array ferrule for use in an optical array connector wherein a main body is profiled to have a fiber receiving cavity extending from a mating face to a rear end between a pair of side surfaces. At least one pin slot is precisely located with respect to the fiber receiving cavity and extends inward from a respective side surface. A plurality of channel plates are formed from the same tool to have a plurality of fiber receiving channels in at least one major surface thereof. Fibers are each positioned within respective fiber receiving channels of the channel plates and located within the fiber receiving cavity to form the array ferrule.

13 Claims, 5 Drawing Sheets

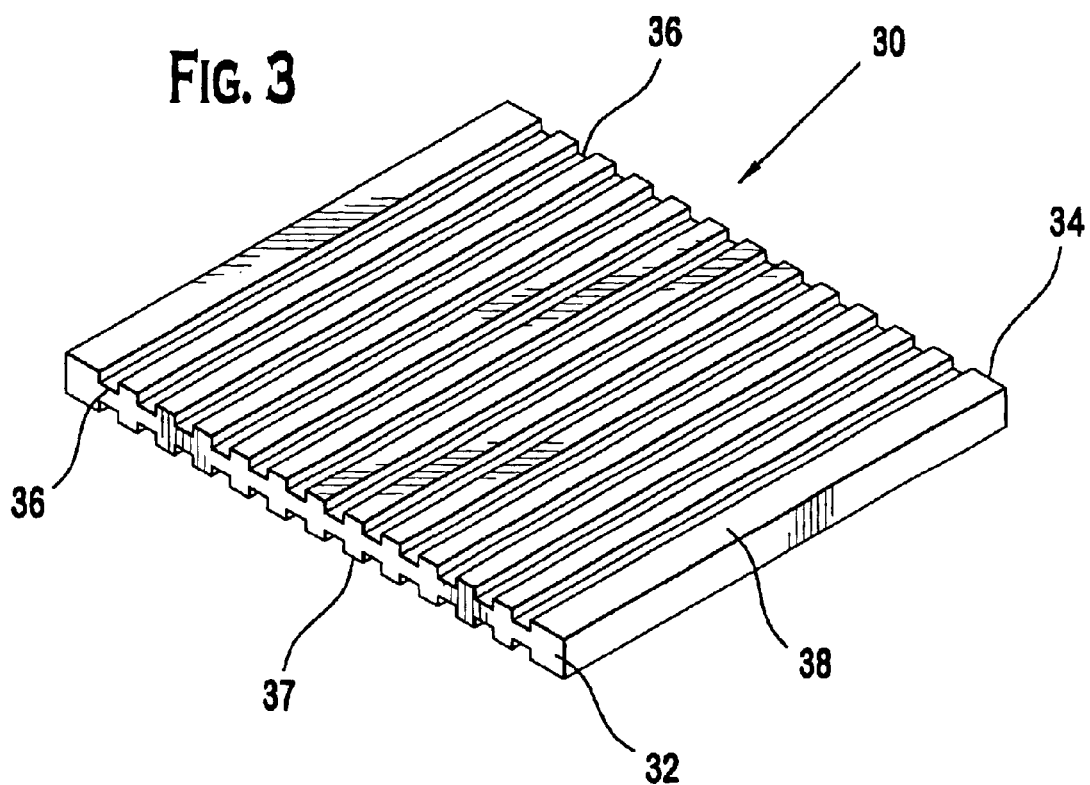
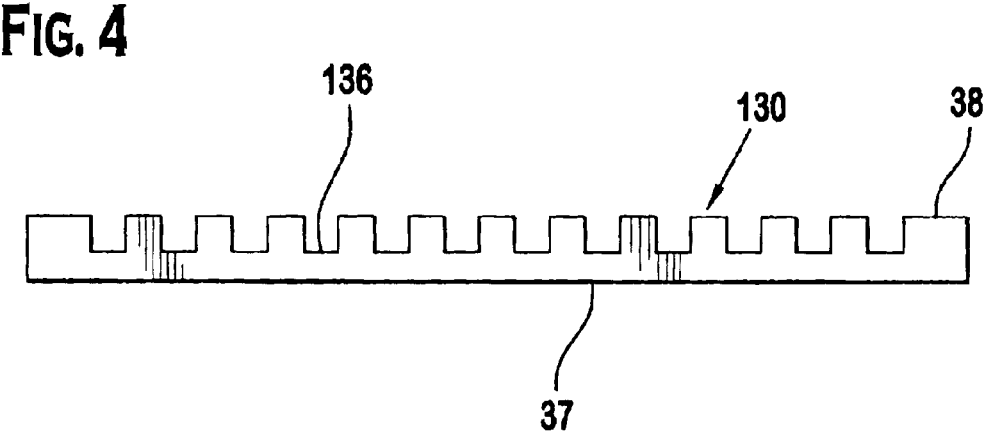

FIBER ARRAY FERRULE

FIELD OF THE INVENTION

The present invention relates to optical connectors and more particularly to a multi fiber array ferrule for use in such optical connectors.

BACKGROUND

Communication systems have grown in complexity furthering the need for greater broadband capabilities. Optical communication systems have been employed in these communication systems and especially in broadband systems for meeting the need to transport large quantities of data, voice and other types of communications over a relatively compact network. Miniaturization of components in optical communication networks also continues to be necessary. Accordingly, multi fiber optical connectors such as the MT-RJ connector have become increasingly popular because of their ability to easily connect a plurality of fibers utilizing a standard form factor within the telecommunications industry. MT-RJ connectors have the capability of terminating a pair or a single row array of fibers utilizing a ferrule within the same connector housing that was previously used for a fiber pair termination.

One such connector has been developed by the MT-RJ Alliance including the companies of Hewlett-Packard, Fujikura, AMP, Siecor, and Usconec. The MT-RJ connector family utilizes an MT ferrule designed to hold 2, 4, 8, 12 or 16 fibers in a linear array. The MT ferrule is a precision molded solid part having tapered fiber receiving passageways which are loaded with a ribbon fiber array from a rear end. In line with the fiber array are a pair of pin receiving holes which are used to align the ferrule end faces of two mated ferrules. The pin holes must be precisely located with respect to the array of fiber receiving channels in order to insure proper alignment and to minimize optical signal attenuation between mated fiber end faces.

U.S. Patent Application Publication U.S. 2003/0016918 provides a multi fiber optical ferrule having a group of fibers terminated from a ribbon and arranged in a linear array. The ribbon is secured into the ferrule with epoxy introduced through a transverse window formed in the ferrule. Once the epoxy is cured, the fibers are cleaved and polished at the front end or mating face to complete the ferrule and fiber array assembly. The ferrule and fiber array assembly may then be loaded into a variety of connector housings which are part of the MT-RJ or other connector systems. Although that publication provides for a multi fiber optical ferrule having a group of fibers arranged in a linear array, it is desirable to increase the number of fibers which may be terminated by such an array ferrule. There is a need, however, to increase the density of fibers in the array while maintaining the same MT-RJ form factor and housing. It should be understood that this problem is not limited to the MT-RJ form factor, but that the need for high density extends to many fiber optic connector families. What is needed is a ferrule and method which is capable of increasing the density of fiber terminations within an existing optical connector housing.

SUMMARY

The invention provides an array ferrule for use in an optical array connector wherein a main body is profiled to have a fiber receiving cavity extending from a mating face to a rear end between a pair of side surfaces. At least one pin slot is precisely located with respect to the fiber receiving cavity and extends inward from a respective side surface. A plurality of channel plates are formed from the same tool to have a plurality of fiber receiving channels in at least one major surface thereof. Fibers are each positioned within respective fiber receiving channels of the channel plates and located within the fiber receiving cavity to form the array ferrule.

BRIEF DESCRIPTION OF THE DRAWINGS

The invention will now be described by way of example with reference to the accompanying figures of which:

FIG. 3 is a perspective view of a channel plate for use in the array ferrule as shown in FIG. 2;

FIG. 4 is an end view of an alternate channel plate;

DETAILED DESCRIPTION OF THE PREFERRED EMBODIMENTS

Figure 1:
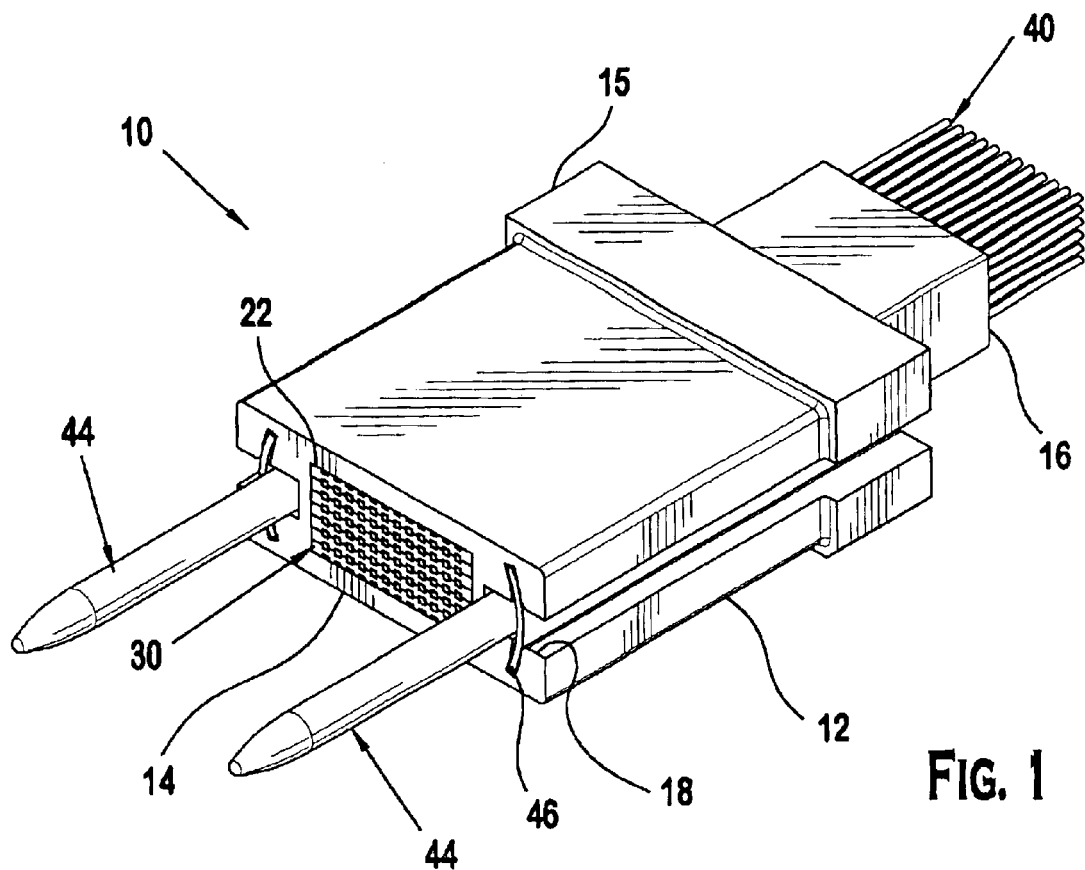
FIG. 1 is a perspective view of the array ferrule according to the present invention.

The optical array ferrule 10 will first be described generally with reference to FIG. 1. The major components of the array ferrule 10 include a main body 12 which supports pins 44 within pin slots 18. Retention members 46 serve to hold the pins 44 within the pin slots 18. A plurality of channel plates 30 are located within a fiber receiving cavity 22 to receive a plurality of optical fibers 40 for termination along a mating face 14. Each of these major components will now be described in greater detail with reference to the remaining figures.

Figure 2:
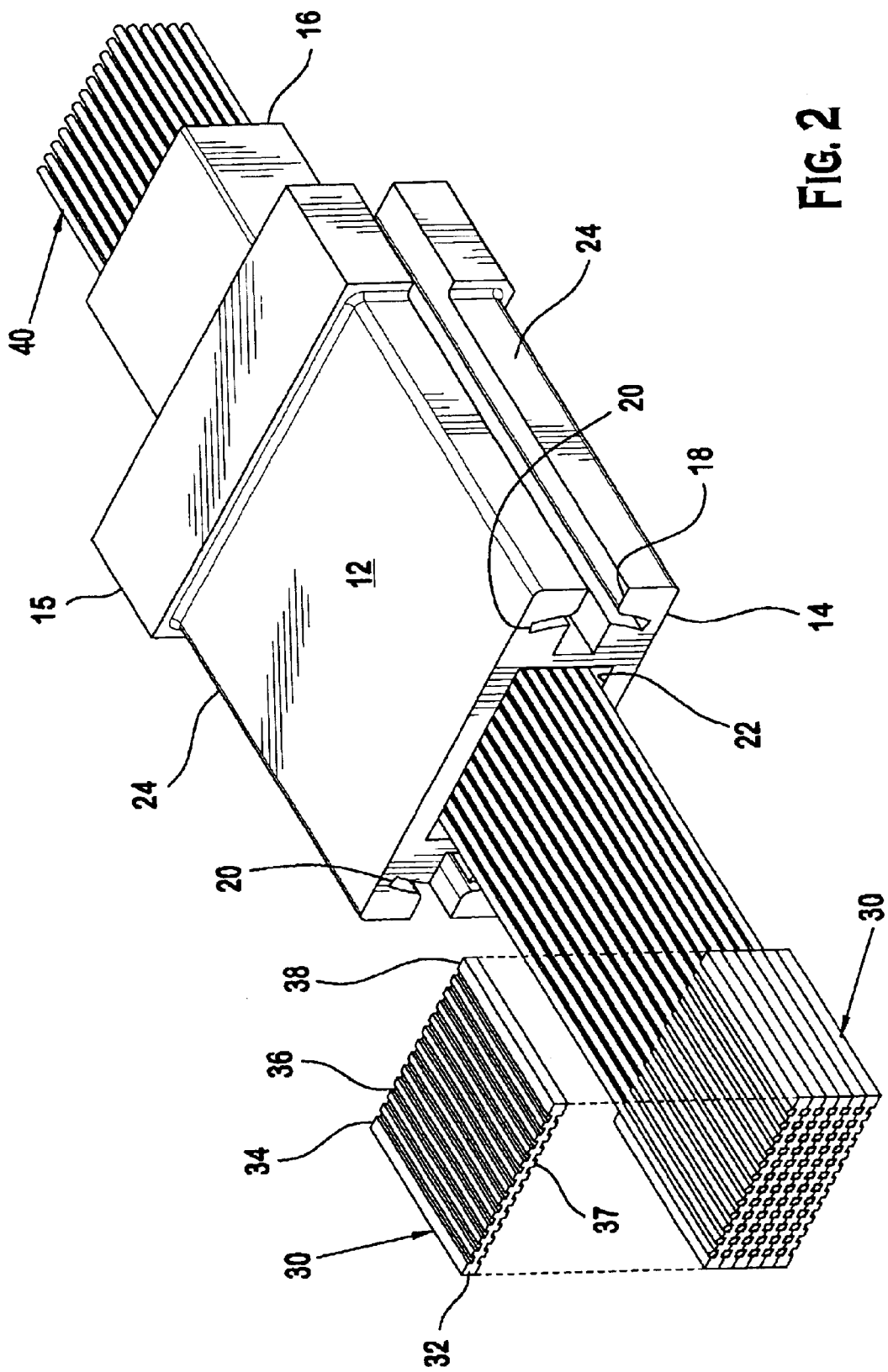
FIG. 2 is an exploded perspective view of the array ferrule of FIG. 1.

Referring first to FIG. 2, the main body 12 will be described in greater detail. The main body 12 is formed of a molded or cast material which exhibits dimensional stability suitable for temperature cycling of a given application. Various metallic compounds, plastics or other composites are suitable for forming the main body 12. For example some suitable materials include but are not limited to: Z-2, Z-5, Z-7, AL-60 63 or AL-60 61. A mating face 14 is formed on one end of the main body 12 and a rear end 16 is located opposite the mating face 14. A flange 15 is located near the rear end 16. A pair of opposing side surfaces 24 extend from the mating face 22 to the read end 16. A fiber receiving cavity 22 extends through the main body 12 between the side surfaces 24 from the mating face 14 back to the rear end 16. A pair of pin slots 18 are formed in the opposing side surfaces 24 and extend from the mating face 14 through the flange 15 to the rear end 16. The pin slots 18 are formed and located in precise relationship to the fiber receiving cavity 22. A retention member slot 20 extends rearward from the mating face 14 through the flange 15 to the rear end 16 and is in communication with the pin slot 18.

The channel plates 30 will now be described in greater detail with reference to FIG. 3. Each channel plate 30 may be formed from sheet material which exhibits thermal stability suitable for the environment in which it will operate. Each channel plate 30 can be made by a number of processes. One method, for example, is to cast metal into a near net shape and finish machine it into the final shape, removing just a thin surface layer, so as to not create stresses of sufficient magnitude to violate the final dimensions. Alternatively, a super precision casting method can be used to produce the channel plate with correct final dimensions. In the process using sheet material, the sheet material is pulled through a tool (not shown) to form a plurality of fiber receiving channels 36 which extend from a front end 32 to a rear end 34. It should be understood that the front and rear ends 32, 34 are formed by cutting the channel plate 30 from a long strip either before or after formation of the fiber receiving channels 36. Each channel plate 30 is machined by the same tool so that the fiber receiving channels 36 of each is precisely located with respect to other channel plates 30. The fiber receiving channels 36 extend between the front and rear ends 32, 34 along a bottom surface 37 and also along a top surface 38. An alternative embodiment of the channel plate 130 is shown in FIG. 4 wherein fiber receiving channels 136 are only located on the top surface 38 leaving the bottom surface 37 uncut. The fiber receiving channels 136 are approximately twice the depth as the fiber receiving channels 36 of the previous embodiment described with reference to FIG. 3. The channel plate 130 is otherwise similarly formed as the channel plate 30.

A plurality of optical fibers 40 as best shown in FIG. 2 may be arranged either as a bundle or may emanate from a group of ribbon fibers to form an array which is located within the fiber receiving cavity 22. The bundle of fibers 40 is terminated within the channel plates 30 along the mating face 14 as will be described below.

Figure 9:
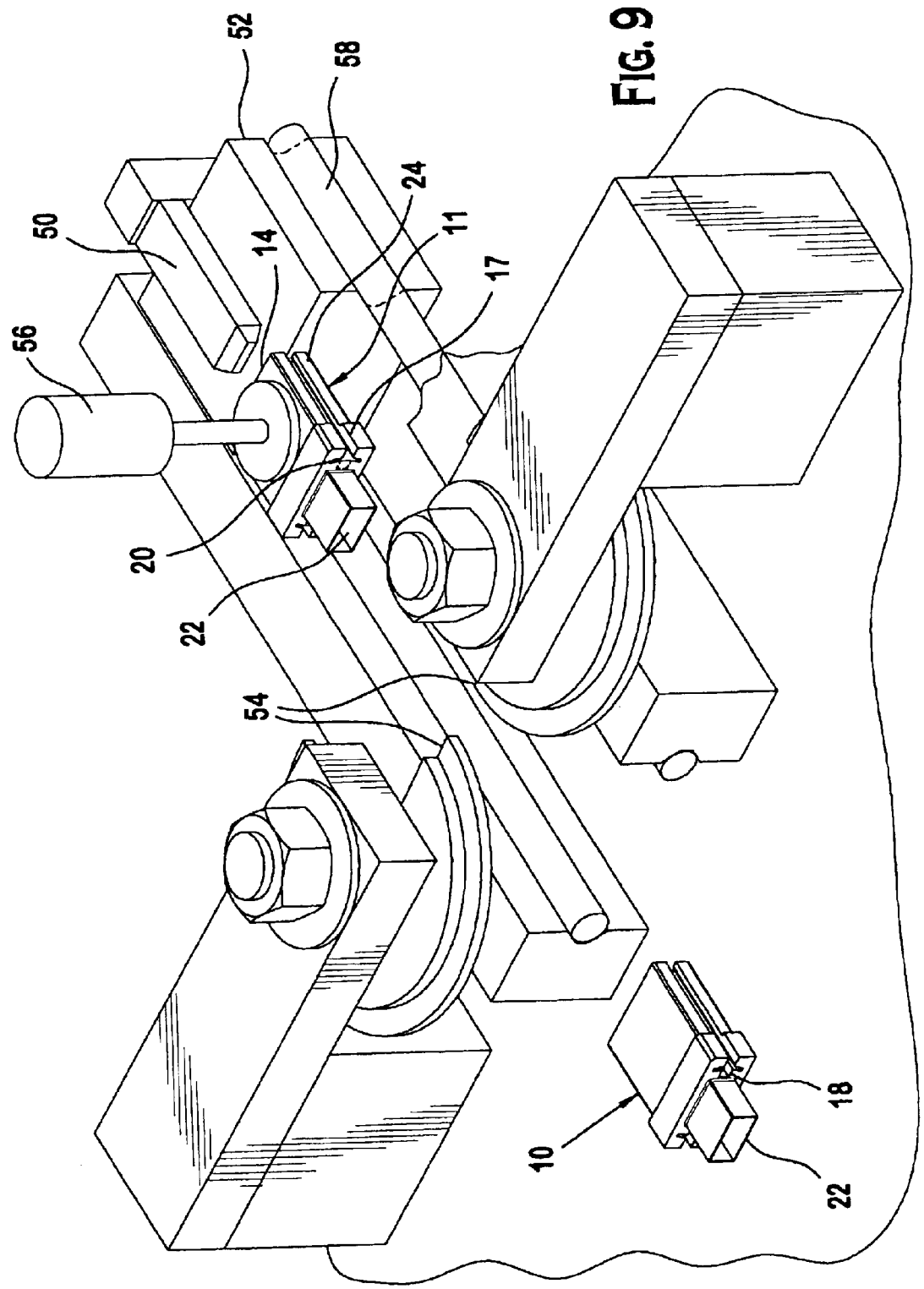

A method of making the array ferrule 10 will now be described in greater detail with reference to FIGS. 2 and 9. Referring first to FIG. 9, a blank 11 of the array ferrule 10 is formed by molding, casting, or other techniques such as powder forming and sintering. It should be noted here that the blank 11 is formed to have preformed slots 17 extending inward from the opposing side surfaces 24. Each preformed slot 17 extends inward only to the respective retention member slot 20. The blank 11 is held by a holding device 56 and is slid over a mandrel 50 such that the mandrel is received within the fiber receiving cavity 22 from the front of the mating face 14. The mandrel 50 is tapered to precisely position the blank 11. The mandrel 50 is mounted on a carrier 52 which is slidable over rails 58 toward a pair of broaches 54 which are precisely located with respect to the mandrel 50. As the carrier 52 is slid past the broaches 54, precise pin receiving slots 18 are cut from the preformed slots 17. The resulting array ferrule 10 has a pair of pin receiving slots 18 precisely located with respect to the fiber receiving cavity 22.

Figure 5:
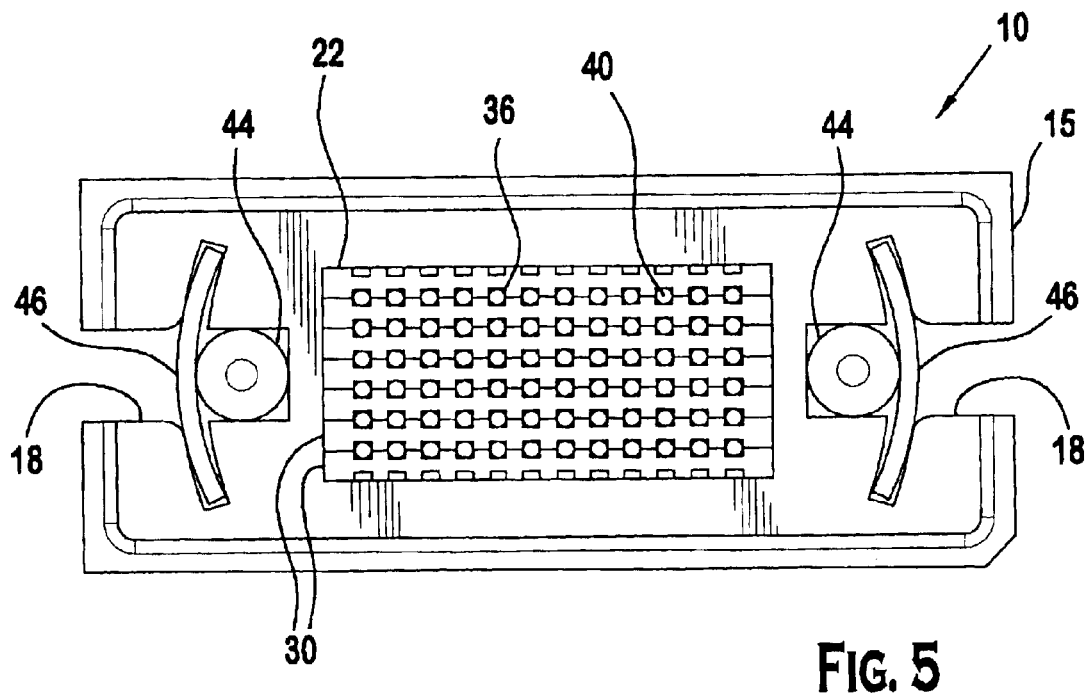
FIG. 5 is an end view of the array ferrule of FIG. 1.

A plurality of fibers 40 prepared for termination by well known techniques is positioned within the fiber receiving cavity 22 as shown in FIG. 2. Each fiber 40 is located within a respective fiber receiving channel 36 of a channel plate 30 and then another channel plate 30 is located on top of the first channel plate 30 such that the fibers 40 are positioned within adjacent fiber receiving channels 136 of the second channel plate 30. As beet shown in FIG. 5, each fiber 40 is therefore captured within a pair of fiber receiving channels 36 such that six points of contact are established between the outer diameter of the fiber 40 and the two channels 36. The channel plates 30 and fibers 40 subassembly is then inserted with a light interference fit into the fiber receiving cavity 22 along the mating face 14. The fibers 40 are inserted into the channels 36 with a light interference fit. The fiber receiving channels 36 are pre-wetted by Locktite or Epoxy. Once the fibers 40 are pressed into the fiber receiving channels 36, the Locktite or Epoxy is retained in the corners of each fiber receiving channel 36 providing retention and stiff support during later polishing steps. The fiber receiving cavity 22 and the channel plates 30 are wet with Locktite. After assembly any Locktite captured in a tight space will harden within a few minutes. Any Locktite not captured in a tight space will not harden and can be readily washed off by a spray contact cleaner or other suitable solvents. The fiber ends are then cleaned and the mating face 14 is polished.

It should be understood that the size of the fiber receiving cavity 22 may be altered in order to receive a greater or fewer number of fibers 40 within the same outer dimensions of the main body 12 as will be described in reference to the alternate embodiments below.

Pins 44 are inserted into the pin slots 18 and pin retention members 46 such as a metallic spring or other suitable retention members are positioned within the retention member slots 20 for retaining the pins 44. It should be understood that the same main body 12 is usable either with or without pins 44. For example, an optical connector mating half would include a main body 12 having pins 44 and a complimentary main body 12 having unpopulated pin slots 18. When mated, the pins 14 of the first main body 12 are received within the unpopulated pin slots 18 of the complimentary main body 12 so that the corresponding fiber end faces are precisely aligned and optically coupled to each other because of the precise relationship of the pin slots 18 to the fiber receiving cavity 22 and the uniformity of the channel plates 30 being formed by the same tool.

Figure 6:
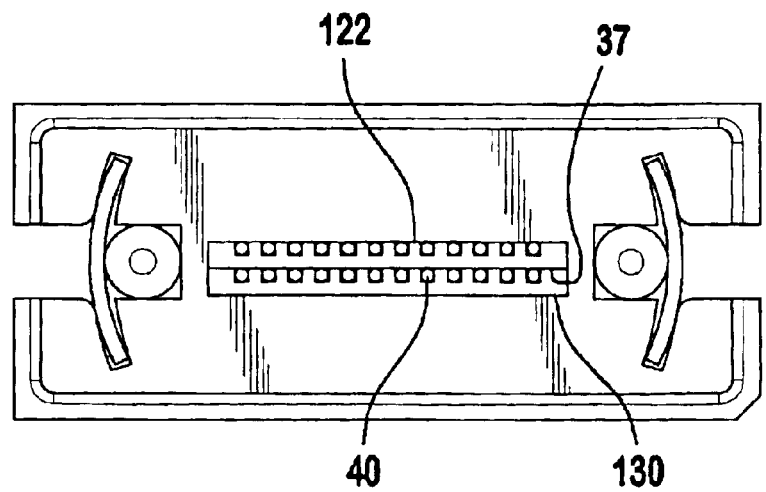
FIG. 6 is an end view of a first alternate embodiment of the array ferrule according to the present invention.
Figure 7:
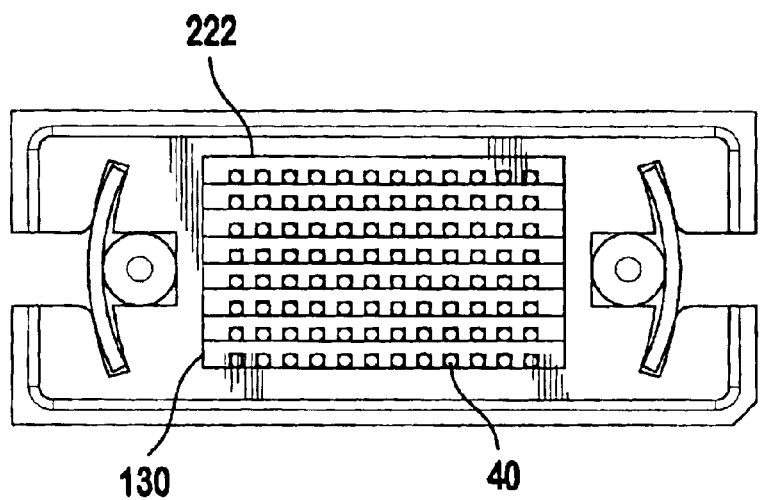
FIG. 7 is an end view of a second alternate embodiment of the array ferrule according to the present invention.
Figure 8:
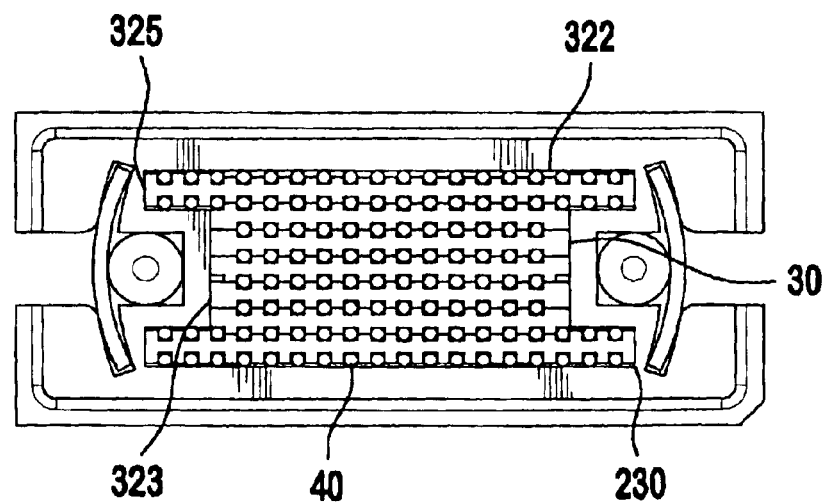
FIG. 8 is an end view of a third alternate embodiment of the array ferrule according to the present invention; and, FIG. 9 is a perspective view of the array ferrule positioned within a broach for broaching the pin slots.

FIGS. 6–8 show various alternate embodiments for achieving different numbers of terminations within various sized two dimensional fiber arrays. It should be understood that the array ferrules of FIGS. 6–8 remain unchanged except for the size of the fiber receiving cavity 122, 222, 322 and the number of channel plates 30, 130 inserted therein. It should also be understood that each fiber receiving cavity 122, 222, 322 is similarly precisely aligned with pin slots 18 which are similarly formed as described in the embodiments above. Referring first to FIG. 6, a first alternate embodiment having a relatively smaller sized fiber receiving cavity 122 is shown. The fiber receiving cavity 122 is sized to receive two channel plates 130 and twenty-four fibers 40. It should be noted here that when the channel plates 130 are substituted for channel plates 30, fibers 40 are positioned between the bottom surface 37 of one channel plate and within the channel 136 of another channel plate forming four points of contact with each fiber 40.

Turning now to FIG. 7, a second alternate embodiment is shown wherein the fiber receiving cavity 222 is relatively larger and is configured to receive eight channel plates 130. The eight channel plates 130 are capable of accommodating ninety-six fibers 40. These fibers 40 are similarly positioned between a fiber receiving channel 136 of one channel plate and a bottom surface 37 of an adjacent channel plate.

FIG. 8 shows yet a third alternate embodiment wherein the fiber receiving cavity 322 takes an alternate shape in order to fill more of the available space within the ferrule to accommodate a greater number of fibers 40. In this embodiment, a plurality of channel plates 30 are positioned within a central portion 323 which is capable of accommodating five channel plates 30. A plurality of second channel plates 230 are positioned within outer portions 325 of the fiber receiving cavity 322. The second channel plates 230 are longer than the channel plates 30, each accommodating a greater number of fibers 40. This embodiment is capable of therefore accommodating a total number of one hundred twenty fibers 40. It should be understood by those reasonably skilled in the art that channel plates 30 and 130 are a direct replacement for each other in order to achieve the desired array arrangement of fibers 40 in the same fiber receiving cavities.

The foregoing illustrates some of the possibilities for practicing the invention. Many other embodiments including various size and shaped fiber receiving cavities are possible within the scope and spirit of the invention. It is also within the spirit of the inventor to change the shape of the main body. It is, therefore, intended that the foregoing description be regarded as illustrative rather than limiting, and that the scope of the invention is given by the appended claims together with their full range of equivalents.

What is claimed is:

1. An array ferrule for use in an optical array connector comprising:

a main body having a fiber receiving cavity extending from a mating face to a rear end and a pair of side surfaces extending rearward from the mating face;

pin slots in the main body each being precisely located with respect to the fiber receiving cavity and extending inward from each side surface; and, a plurality of channel plates located in the fiber receiving cavity each being formed from the same tool to have a plurality of fiber receiving channels formed in a major surface thereof.

2. The array ferrule of claim 1 further comprising a pair of retention member slots which are in communication with each pin slot.

3. The array ferrule of claim 2 further comprising a pair of retention members located within the retention member slots.

4. The array ferrule of claim 3 further comprising a pin secured within the pin slot by engagement with the retention member.

5. The array ferrule of claim 1 wherein the plurality of fiber receiving channels is formed along a top surface of each channel plate.

6. The array ferrule of claim 5 wherein the plurality of fiber receiving channels formed in the top surface is aligned with a second plurality of fiber receiving channels formed in the bottom surface.

7. The array ferrule of claim 1 wherein the fiber receiving cavity has a central portion positioned approximately between the pin slots and at least one outer portion extending from the central portion and being partially located adjacent one of the pin slot.

8. The array ferrule of claim 1 further comprising a plurality of fibers each positioned within respective fiber receiving channels of the channel plates.

9. A method of making an array ferrule for an optical connector comprising:

providing a main body blank having a mating face, a rear end and a pair of side walls extending from the mating face toward the rear end, the main body blank having a fiber receiving cavity extending from the mating face to the rear end between the side surfaces;

precisely aligning the main body blank on a mandrel placed within the fiber receiving cavity;

broaching a pin slot in each side surface of the main body such that the pin slot is precisely located with respect to the fiber receiving cavity; and, populating the fiber receiving cavity with a plurality of channel plates comprising fiber ends within fiber receiving channels formed in the channel plates.

10. The method of claim 9 further comprising forming a retention member slot in the main body blank such that the retention member slot is in communication with the pin slot.

11. The method of claim 10 comprising inserting a pin into the pin slot.

12. The method of claim 11 further comprising the step of inserting a retention member into the retention member slot such that it is in contact with the pin and retains the pin in the pin slot.

13. The method of claim 9 further comprising polishing the mating face.

\* \* \* \* \*